US00RE42076E

(19) United States
(12) Reissued Patent
Bass et al.

(10) Patent Number: US RE42,076 E
(45) **Date of Reissued Patent: *Jan. 25, 2011**

(54) COMPOSITES OF INORGANIC LUMINOPHORES STABILIZED IN POLYMER HOSTS

(75) Inventors: Michael Bass, Vero Beach, FL (US); Kevin D. Belfield, Oviedo, FL (US)

(73) Assignee: University of Central Florida Research Foundation, Inc., Orlando, FL (US)

( * ) Notice: This patent is subject to a terminal disclaimer.

(21) Appl. No.: 11/655,816

(22) Filed: Jan. 18, 2007

Related U.S. Patent Documents

Reissue of:
(64) Patent No.: 6,844,387
Issued: Jan. 18, 2005
Appl. No.: 09/919,130
Filed: Jul. 31, 2001

U.S. Applications:
(63) Continuation-in-part of application No. 09/448,657, filed on Nov. 24, 1999, now Pat. No. 6,327,074.
(60) Provisional application No. 60/109,837, filed on Nov. 25, 1998.

(51) Int. Cl.
*C08K 3/10* (2006.01)

(52) U.S. Cl. ..... 524/403; 524/130; 524/132; 524/413; 252/301.36; 252/700

(58) Field of Classification Search ..... 252/301.36, 252/700; 524/403, 413
See application file for complete search history.

(56) References Cited

U.S. PATENT DOCUMENTS 4,448,547 A 5/1984 Wickersheim
4,791,415 A 12/1988 Takahashi
4,871,231 A 10/1989 Garcia, Jr.
4,978,888 A 12/1990 Anandan et al.
5,003,179 A * 3/1991 Pollack ..... 250/483.1
5,051,278 A * 9/1991 Paz-Pujalt ..... 427/108
5,142,388 A 8/1992 Wantanabe
5,154,962 A * 10/1992 Mertens et al. ..... 428/41.8
5,184,114 A 2/1993 Brown
5,192,946 A 3/1993 Thompson et al.
5,245,623 A * 9/1993 McFarlane ..... 372/69
5,317,348 A 5/1994 Knize
5,359,345 A 10/1994 Hunter ..... 345/102
5,583,393 A 12/1996 Jones
5,622,807 A * 4/1997 Cutler et al. ..... 430/139
5,746,942 A 5/1998 Bowman et al.
5,786,102 A 7/1998 Paz-Pujalt et al.
5,801,792 A 9/1998 Smith et al.
5,846,684 A * 12/1998 Paz-Pujalt et al. ..... 430/139
5,956,172 A 9/1999 Downing ..... 359/326
5,985,990 A * 11/1999 Kantner et al. ..... 524/765
5,989,799 A * 11/1999 Verbeeck et al. ..... 430/567
6,028,977 A 2/2000 Newsome
6,061,179 A 5/2000 Inoguchi et al.
6,117,529 A 9/2000 Leising et al.
6,128,131 A 10/2000 Tang
6,276,801 B1 8/2001 Fielding
6,501,590 B2 12/2002 Bass et al.
6,654,161 B2 * 11/2003 Bass et al. ..... 359/326
6,897,999 B1 5/2005 Bass et al.
7,075,707 B1 * 7/2006 Rapaport et al. ..... 359/326
7,101,061 B2 9/2006 Nagai et al.

OTHER PUBLICATIONS

Alexander A. Kaminskii, Laser Crystals, vol. 14, p. 170–311, Springer Series in Optical Science, 1981.*

* cited by examiner

*Primary Examiner*—Edward J Cain
(74) *Attorney, Agent, or Firm*—Woodcock Washburn LLP

(57) ABSTRACT

A two and three dimensional display medium having a novel transparent polymer composite containing particles of crystals doped with $Yb^{3+}$ and other rare earth ions. The polymer composite creates homogeneously dispersed compositions without cracking or delamination of the film and can be used for various optical applications.

86 Claims, 1 Drawing Sheet

COMPOSITES OF INORGANIC LUMINOPHORES STABILIZED IN POLYMER HOSTS

Matter enclosed in heavy brackets [ ] appears in the original patent but forms no part of this reissue specification; matter printed in italics indicates the additions made by reissue.

This invention relates to composites, and in particular to a class of stabilized luminescent polymer(plastic) composites for use in two and three dimensional luminescent displays, and the invention is a Continuation-In-Part of U.S. application Ser. No. 09/448,657 filed Nov. 24, 1999, now U.S. Pat. No. 6,327,074, which has the same assignee as the subject invention, and a common inventor with the subject invention, which claims the benefit of U.S. Provisional application 60/109,837 filed Nov. 25, 1998, by the same assignee as the subject invention, and the invention was funded in part under U.S. Army Contract DAAD199910220.

BACKGROUND AND PRIOR ART

The doping of heavy metal luminophores in commercially available optical grade plastics, such as poly (methyl methacrylate) or polystyrene, generally results in the aggregation of the metal salt. This aggregation leads to excessive light scattering, weakening of the plastic's mechanical strength, and an inhomogenous composite that would be unsuitable for optical or display applications.

Using a monochromatic display has been well known. However, monochromatic displays do not offer adequate color type detail such as reds, greens and blue colors.

Displays using liquid crystals have been proposed for generating color displays. See for example, U.S. Pat. Nos. 5,359,345 and 5,724,062 to Hunter. However, these patents require arranging individual pixels in rows and corresponding columns, column 4, lines 36–39. The devices described can be expensive and complicated to manufacture, and can have narrow angular view ranges with low brightness.

Additional display systems have been proposed with similar problems to those described above. See for example, U.S. Pat. No. 4,791,415 to Takahashi; U.S. Pat. No. 4,871,231 to Garcia, Jr.; U.S. Pat. No. 5,184,114 to Brown; U.S. Pat. No. 5,192,946 to Thompson et al.; and U.S. Pat. No. 5,317,348 to Knize.

Several patents have been proposed for panel displays using two-frequency upconversion fluorescence. See for example, U.S. Pat. Nos. 5,684,621; 5,764,403; 5,914,807; 5,943,160; and 5,956,172 all to Downing. The Downing '403 patent appears to be the most relevant to the subject invention. Downing '403 is primarily concerned with embodiments where the use of different layers for red, green and blue emitters, abstract, FIG. 6, and briefly describes some mixing of only crystal type materials in a single display media. However, for the single display media, Downing '403 uses nanometer sized particles, column 4, lines 33+, column 9, lines 42–45, which would inherently be difficult to form, handle and disperse in a display medium.

Other known patents such as U.S. Pat. Nos. 5,003,179 to Pollack; U.S. Pat. No. 5,051,278 to Paz-Pujalt; U.S. Pat. No. 5,154,962 to Mertens et al.; U.S. Pat. No. 5,245,623 to McFarlane; U.S. Pat. No. 5,622,807 to Cutler; U.S. Pat. No. 5,846,684 to Paz-Pujalt et al. also fail to overcome the problems with the other patents described above.

SUMMARY OF THE INVENTION

The primary objective of this invention is to provide an inexpensive display medium for two and three dimensional displays.

The secondary objective of this invention is to provide a transparent polymer(plastic) containing particles doped with rare ions for use as display medium for two and three dimensional displays.

The third objective of this invention is to provide homogeneously dispersed compositions in a polymer composition without cracking or delamination The fourth objective of this invention is to provide a display medium for the up conversion of near infrared light to the visible for two and three dimensional displays.

The fifth objective of this invention is to provide an inexpensive display medium that is versatile for various optical system applications.

The sixth objective of this invention is to provide homogeneously dispersed compositions in a polymer composition that can be used as plastic optical fiber amplifiers.

The invention can be used with up conversion displays with specific applications for two and three dimensional displays such as those described in parent patent applications Ser. No. 09/448,657 filed Nov. 24, 1999, by the same assignee as the subject invention and of which is incorporated by reference.

A novel polymer composition for display mediums according to the subject invention can include a co-polymer composite of an alkyl material and a phosphonate material, and luminescent metal ions dispersed in the composite, wherein the composition can be used for displays. The alkyl material can be an alkyl acrylate, and alkyl methacrylate. The phosphate material can be dialkyl vinylbenzylphosphonate, alkyl vinylbenzylphosphonic acid monoester, and vinylbenzylphosphonic acid.

The composition can have a molar ratio of approximately 20% to approximately 95% acrylate material, and approximately 80% to approximately 5% phosphate material.

The luminescent metal ions can include rare earth compounds, and $NaYF_4$:ErYb. The composite can be phosphorylated polymethyl methacrylate(p-PPMA).

The luminescent metal ions can include rare earth ions co-doped with $Yb^{3+}$ in fluoride and orthophosphate crystalline hosts. The doping ion can be Tm, Er, Ho, Nd, Pr, and Ce. The crystalline hosts can include $NaYF_4$, KYF, YLF, and $LuPO_4$.

A method of making a polymer composition is also disclosed and includes steps of forming a co-polymer from an alkyl material and a phosphonate material, and dispersing luminescent metal ions in the co-polymer without cracking and delaminating of the co-polymer.

Further objects and advantages of this invention will be apparent from the following detailed description of a presently preferred embodiment which is illustrated schematically in the accompanying drawings.

DETAILED DESCRIPTION OF THE INVENTION

Figure 1:
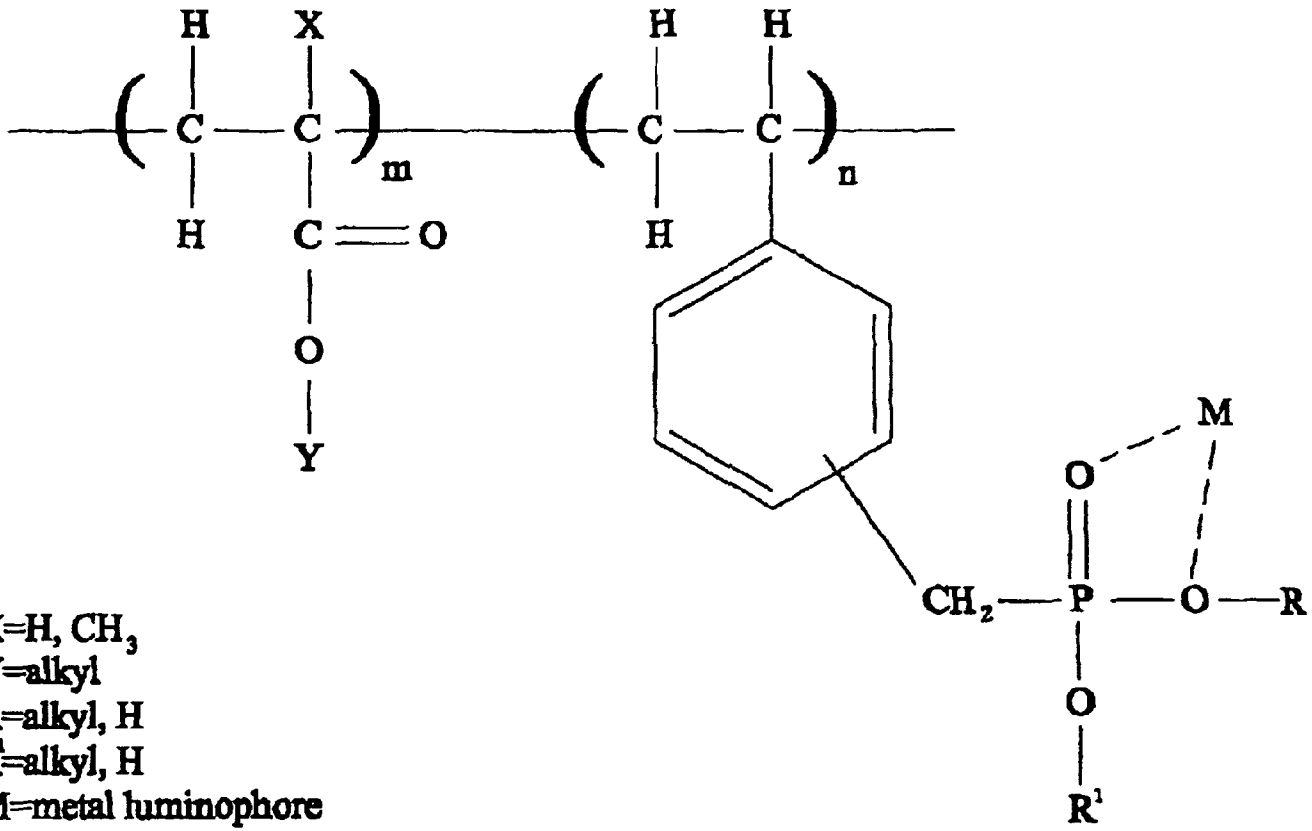
FIG. 1 shows the stabilization of the dispersed heavy element luminophores being accomplished through complexation with the phosphoryl moieties.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

As previously described, the subject invention can be used with up conversion displays with specific applications for two and three dimensional displays such as those described in parent patent applications Ser. No. 09/448,657 filed Nov. 24, 1999, by the same assignee as the subject invention and of which is incorporated by reference.

The subject invention is for a class of luminescent polymer(plastic) composites for use in two and three dimensional luminescent displays. The polymer composite can contain phosphonate or phosphonic acid functional groups that complex the heavy metal luminophore, leading to a homogeneous dispersion of the luminophore. The polymer or plastic host facilitates formation of a stabilized luminescent, thermoplastic polymer composite that can be cast as conformal thin films, molded in sheets, conformal geometries, and the like. The conformal thin films can be plastic films that can be formed over any surface geometry, having thickness of approximately 1 mm to approximately 200 mm, and be formed from processes such as but not limited to spin coating, and the like. The molded Sheets can be Sheets of various thickness formed by melt processing, and the like, having thickness of approximately 0.1 mm to approximately 25 mm, and be formed from processes such as but not limited to melt processing, compression molding, and the like. The conformal geometries would include any geometry, planar or non planar.

The polymeric composites are prepared from commercially available materials and are low cost, and can include any acrylate material, any methacrylate, material, any styrene material, and the like. The low cost factor of these materials, can be approximately $20/kg.

FIG. 1 shows the stabilization of the dispersed heavy element luminophores being accomplished through complexation with the phosphoryl moieties.

Table 1 is a list of various crystals and co dopants and central wavelengths of the bands of visible emission detected following excitation with a diode laser source operating at 968 nm.

TABLE 1

Visible emission of Tm, Er and Ho after Yb excitation in different hosts

| Doping ion | | Peak emission wavelength (nm) | | |
|---|---|---|---|---|
| $Yb^{3+}$ + | Crystal host | blue | green | Red |
| $Tm^{3+}$ | $NaYF_4$ | 450, 475 | | 647, 698 |
| | KYF | 481 | | 652 |
| | YLF | 483 | | 648 |
| | $LuPO_4$ | 475 | | 649, 704 |
| $Er^{3+}$ | $NaYF_4$ | 411 | 540 | 660 |
| | KYF | | 550 | 654, 670 |
| | YLF | | 541, 549 | 654, 668 |
| | $LuPO_4$ | | 526, 550 | 657, 667 |
| $Ho^{3+}$ | $NaYF_4$ | | 540 | 648 |
| | KYF | | 544 | 658 |

In Table 1, $Yb^{3+}$ refers to ytterbium, $Tm^{3+}$ refers to thulium, $Er^{3+}$ refers to erbium, $Ho^{3+}$ refers to holmium, $NaYF_4$ refers to crystal sodium yttrium fluoride, and the supercript 3+ refers to the triply ionized state of the atom. Referring again to Table 1, KYF is short for $KYF_4$ and refers to crystal, potassium yttrium fluoride. YLF is short for $YliF_4$ and refers to the crystal, yttrium lithium fluoride. $LuPO_4$ refers to the crystal, lutetium orthophosphate.

The crystals and dopants listed in Table 1 are illustrative of a few of the combinations that can be used. Other lanthanide(rare earth) atoms in the 3+ state can also be used as dopants. For example, $Nd^{3+}$, $Pr^{3+}$, $Ce^{3+}$ and the like, can also be used. There can be other oxide and flouride crystals that can serve as host crystals. Transition metal dopants such as but not limited to $Cr^{3+}$, $Ti^{3+}$ and the like, can serve as dopants in these host crystals as well. Additionally, other crystals and activators that can be used for this invention can include those listed from pages 171 to page 311 listed in Laser Crystals by Alexander Kaminski,( Springer Verlag, N.Y.) SBN 0-387-09576-4, 1981. These crystals and their activators can include but are not limited to the following described activators and crystal combinations.

Activator $Pr^{3+}$ and crystals can include: $LiYF_4$, $Ca(NbO_3)_2$, $CaWO_4$, and $SrMoO_4$.

Activator $Nd^{3+}$ and crystals can include: $LiYF_4$, $LiYO_2$, $LiNbO_3$, $LiNbP_4O_{12}$, $CaF_2$, $SrF_2$, $BaF_2$, $LaF_3$, $CeF_3$, NaF, $NaCaYF_6$, $NaCaCeF_6$, $NaNdP_4O_{12}$, $YF_3$, CaYF, SrYF, $CeO_2$, $GdF_3$, $YF_3$, $LuF_3$, $CdF_2$, $KY(MoO_4)_2$, $KY(WO_4)_2$, $KNdP_4O_{12}$, $KGd(WO_4)_2$, $CaMg_2Y_2$, $CaAl_4O_7$, $CaAl_{12}O_{19}$, $CaSc_2O_4$, $Ca_3(VO_4)_2$, $Ca(NbO_3)_2$, $CaMoO_4$, $CaWO_4$, $SrAl_2O_7$, $SrAl_{12}O_{19}$, $SrMoO_4$, $SrWO_4$, $Y_2O_3$, $YAlO_3$, $Y_3Al_5O_{12}$, $Y_2SiO_5$, $YP_5O_{14}$, $Y_3Sc_2Al_3O_{12}$, $Y_3Sc_2Ga_3O_{12}$, $YVO_4$, $Y_3Ga_5O_{12}$, $(Y, Lu)_3Al_5O_{12}$, $Ba_{0.25}Mg_{2.75}Y_2$, $LaBe_2O_5$, $La_2O_3$, $LaAlO_3$, $LaP_5O_{14}$, $LaNbO_4$, $CeP_5O_{14}$, $NdAl_3(BO_3)_4$, $NdP_5O_{14}$, $Gd_2O_3$, $GdAlO_3$, $GdP_5O_{14}$, $GdScO_3$, $Gd_3Sc_2Al_3O_{12}$, $Gd_3Sc_2Ga_3O_{12}$, $Gd_3Ga_5O_{12}$, $Gd_2(MoO_4)_3$, $LuAlO_3$, $Lu_3Ga_5O_{12}$, $PbMoO_4$, $Bi_4Si_3O_{12}$, $Bi_4Ge_3O_{12}$, $LiLa(MoO_4)_2$, $Li(Nd\ La)P_4O_{12}$, $Li(Nd, Gd)P_4O_{12}$, $LiGd(MoO_4)_2$, $NaLa(MoO_4)_2$, $NaLa(WO_4)_2$, $Na_3Nd(PO_4)_2$, $Na_5Nd(WO_4)_2$, $Na_3Gd(WO_4)_2$, Na(Nd, Gd), $Ka(MoO_4)_2$, $K_3Nd(PO_4)_2$, $K_3(Nd, La)$, $K_3Nd(MoO_4)_4$, $K_5Bi(MoO_4)_4$, $CaY_4(SiO_4)_3O$, $Ca_{0.25}Ba_{0.75}$, $CaLa_4(SiO_4)_3O$, $CaLa(PO_4)_3O$, $CaGd_4(SiO_4)_3O$, $YScO_3$, $Y_2Ti_2O_7$, $ZrO_2$—$Y_2O_3$, $Ba_2MgGe_2O_7$, $Ba_2ZnGe_2O_7$, (Nd, Sc)$P_5O_{14}$, (Nd, In)$P_5O_{14}$, (Nd, La)$P_5O_{14}$, (Nd, Gd)$Al_3$, $LuScO_3$, $HfO_2$—$Y_2O_3$, $Bi_4(Si, Ge)_3O_{12}$, $Ca_5(PO_4)_3F$, $Sr_5(PO_4)_3F$, and $La_2O_2S$, $CeCl_3$, $Pb_5(PO_4)_3F$.

Activator $Ho^{3+}$ and crystals can include: $LiYF_4$, $Li(Y, Er)F_4$, $LiNbO_3$, $CaF_2$, $LiHoF_4$, $BaY_2F_8$, $Ba(Y,Er)_2F_8$, $HoF_3$, $CaF_2$, $YF_3$, $ErF_3$, $NaCaErF_6$, $K(Y, Er)(WO_4)_2$, $KGd(WO_4)_2$, $Ca(NbO_3)_2$, $CaMoO_4$, $CaWO_4$, $YAlO_3$, $Y_3Al_5O_{12}$, $Y_2SiO_5$, $YVO_4$, $Y_3Fe_5O_{12}$, $Y_3Ga_5O_{12}$, $(Y, Er)Al_3$, $(Y, Er)_3Al_5O_{12}$, $LaNbO_4$, $GdAlO_3$, $Ho_3Al_5O_{12}$, $Ho_3Sc_2Al_3O_{12}$, $Ho_3Ga_5O_{12}$, $Er_2O_3$, $ErAlO_3$, $Er_2SiO_5$, $Er_3Sc_2Al_3O_{12}$, $ErVO_4$, $(Er, Tm, Yb)_3$, $(Er, Lu)AlO_3$, $Yb_3Al_5O_{12}$, $LuAlO_3$, $Lu_3Al_5O_{12}$, $NaLa(MoO_4)_2$, $CaY_4(SiO_4)_3O$, $SrY_4(SiO_4)_3O$, $SrLa_4(SiO_4)_3O$, $ZrO_2$—$Er_2O_3$, $Ba_2NaNb_5O_{15}$, and $Ca_5(PO_4)_3F$.

Activator $Er^{3+}$ and crystals can include: $LiYF_4$, $LiErF_4$, $CaF_2$, $BaY_2F_8$, $Ba(Y,Er)_2F_8$, $LaF_3$, $YF_3$, $ErF_3$, $K(Y, Er)(WO_4)_2$, $KGd(WO_4)_2$, $CaAl_4O_7$, $Ca(NbO_3)_2$, $CaWO_4$, $YAlO_3$, $Y_3Al_5O_{12}$, $(Y, Er)_3Al_5O_{12}$, $GdAlO_3$, $Er_3Al_5O_{12}$, $(Er, Lu)_3Al_5O_{12}$, $Yb_3Al_5O_{12}$, $LuAlO_3$, and $Lu_3Al_5O_{12}$.

Activator $Ni^{2+}$ and crystals can include: $MgF_2$, $MnF_2$, and MgO. Activator $V^{2+}$ and crystals can include: $MgF_2$. Activator $Co^{2+}$ and crystals can include: $MgF_2$, $KMgF_2$, and $ZnF_2$. Activator $Yb^{3+}$ and crystals can include: $CaF_2$,:$Nd^{3+}$, $Y_3Al_5O_{12}$, $Y_3Ga_5O_{12}$, $(Y, Yb)_3Al_5O_{12}$, $Gd_3Sc_2Al_3O_{12}$, $Gd_3Ga_5O_{12}$, $(Yb, Lu)_3Al_5O_{12}$, $Lu_3Al_5O_{12}$, $Lu_3Sc_2Al_3O_{12}$, and $Lu_3Ga_5O_{12}$. Activator $Sm^{2+}$ and crystals can include: $CaF_2$, $SrF_2$. Activator $Dy^{2+}$ and crystals can include: $CaF_2$, $SrF_2$. Activator $Dy^{3+}$ and crystals can include: $Ba(Y,Er)_2F_8$. Activator $Tm^{2+}$ and crystals can include: $CaF_2$.

Activator $Tm^{3+}$ and crystals can include: $CaF_2$, $SrF_2$, $ErF_3$, $NaCaErF_6$, $LiNbO_3$, $Ca(NbO_3)_2$, $CaMoO_4$, $CaWO_4$, $YAlO_3$, $Y_3Al_5O_{12}$, $YVO_4$, $(Y, Er)Al_3$, $(Y, Er)_3Al_5O_{12}$, $GdAlO_3$, $Er_2O_3$, $ErAlO_3$, $Er_3Al_5O_{12}$, $(Er, Yb)_3Al_5O_{12}$, $(Er, Lu)AlO_3$, $Lu_3Al_5O_{12}$, and $ZrO_2$—$Er_2O_3$.

Activator $U^{3+}$ and crystals can include: $CaF_2$, $SrF_2$, and $BaF_2$. Activator $Pr^{3+}$ and crystals can include: $LaF_3$, $LaCl_3$, $LaBr_3$, $PrCl_3$, and $PrBr_3$. Activator $Cr^{3+}$ and crystals can include: $BeAl_2O_4$, $Al_2O_3$, and $Y_3Al_5O_{12}$. Activator $Eu^{3+}$ and crystals can include: $Y_2O_3$, $YVO_4$. Activator $Gd^{3+}$ and crystals can include: $Y_3Al_5O_{12}$.

Some of the dopant-host combinations can also emit useful infrared light through excitation by absorption of a single photon. This invention can also include systems that emit infrared light by this process of down-conversion(e.g. absorbing a high energy photon and emitting one of lower energy) as well as systems that are excited by such two photon processes as up-conversion(e.g. absorbing more than one low energy photons and emitting one or more higher energy photons).

Unprecedented doping levels of the heavy metal luminophore can be achieved whilst maintaining even dispersion of the luminophore. The physical and mechanical properties of the polymer composite can be tailored by controlling the monomer and luminophore dopant composition.

The polymer host can be comprised of a copolymer of alkyl acrylate or alkyl methacrylate and a dialkyl vinylbenzylphosphonate, alkyl vinylbenzylphosphonic acid monoester, or vinylbenzylphosphonic acid, as shown in FIG. 1. The ratios of the acrylate or methacrylate to the phosphonate can range from approximately 95:5 molar ratio to approximately 20:80 molar ratio, respectively. Luminescent heavy metal ions such as rare earth compounds(for example, $NaYF_4$:ErYb) loading in the host polymer matrix can range from approximately 5 up to approximately 80 weight percent. Stabilization of the dispersed heavy element luminophores can be accomplished through complexation with the phosphoryl moieties, as shown in FIG. 1.

As described in the parent U.S. Patent applications previously cited, one can prepare the crystals as approximately 10 μm size particles and disperse them in a phosphorylated polymethylmethacrylate (p-PMMA) host. This results in a display medium that can be formed to any desired shape, can be transparent or not, as desired, and can be affixed to any desired substrate. Experiments have been conducted using several different rare earth ions co-doped with $Yb^{3+}$ in fluoride and orthophosphate crystalline hosts. The $Yb^{3+}$ ions absorb light in a fairly broad band near approximately 975 nm in these crystals. They then can efficiently transfer the absorbed energy to levels of the co-dopant from which visible light can be emitted. This process, one in which sequential absorption of two photons of near infrared energy by donor ions which then transfer that energy to a single acceptor ion in such a manner as the acceptor can then emit visible light, is called up conversion.

An additional application of these composite materials can include their use as plastic optical fiber amplifiers, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A polymer composition for [display mediums] *optical devices*, comprising:

a co-polymer composite of an alkyl material and a phosphonate material; and luminescent metal ions dispersed in the composite[, wherein the composition is used for displays].

2. The composition of claim 1, wherein the alkyl material includes:

alkyl acrylate.

3. The composition of claim 1, wherein the alkyl material includes:

alkyl methacrylate.

4. The composition of claim 1, wherein the phosphate material includes:

dialkyl vinylbenzylphosphonate.

5. The composition of claim 1, wherein the phosphate material includes:

alkyl vinylbenzylphosphonic acid monoester.

6. The composition of claim 1, wherein the phosphate material includes: vinylbenzylphosphonic acid.

7. The composition of claim 1, wherein the composite has a molar ratio of:

approximately 20% to approximately 95% acrylate material; and approximately 80% to approximately 5% phosphate material.

8. The composition of claim 1, wherein the luminescent metal ions include:

rare earth compounds.

9. The composition of claim 1, wherein the luminescent metal ions include:

$NaYF_4$:ErYb.

10. The composition of claim 1, wherein the composite is:

phosphorylated polymethyl methacrylate (p-PPMA).

11. The composition of claim 1, wherein the luminescent metal ions include:

rare earth ions co-doped with $Yb^{3+}$ in fluoride and orthophosphate crystalline hosts.

12. The composition of claim 11, wherein the doping ion further includes:

Tm.

13. The composition of claim 11, wherein the doping ion further includes:

Er.

14. The composition of claim 11, wherein the doping ion further includes:

Ho.

15. The composition of claim 11, wherein the doping ion further includes:

Nd.

16. The composition of claim 11, wherein the doping ion further includes:

Pr.

17. The composition of claim 11, wherein the doping ion further includes:

Ce.

18. The composition of claim 11, wherein the crystalline hosts include:

$NaYF_4$.

19. The composition of claim 11, wherein the crystalline hosts include:

KYF.

20. The composition of claim 11, wherein the crystalline hosts include:

YLF.

21. The composition of claim 11, wherein the crystalline hosts include:

$LuPO_4$.

22. A polymer composition for optical applications, comprising:

a co-polymer composite host of an alkyl material and a [phosponate] *phosphonate* material; and luminescent metal ions dispersed in the composite host without cracking and delamination of the composite host, wherein the composition is used for optical applications.

23. A method of making a polymer composition, comprising the steps of:

forming a co-polymer from an alkyl material and a phosphonate material; and dispersing luminescent metal ions in the co-polymer without cracking and delaminating of the co-polymer.

*24. A display comprising a polymer composition comprising a co-polymer composite of an alkyl material and a phosphonate material; and luminescent metal ions dispersed in the composite.*

*25. The display of claim 24, wherein the alkyl material includes: alkyl acrylate.*

*26. The display of claim 24, wherein the alkyl material includes: alkyl methacrylate.*

*27. The display of claim 24, wherein the phosphonate material includes: dialkyl vinylbenzylphosphonate.*

*28. The display of claim 24, wherein the phosphonate material includes: alkyl vinylbenzylphosphonic acid monoester.*

*29. The display of claim 24, wherein the phosphonate material includes: vinylbenzylphosphonic acid.*

*30. The display of claim 24, wherein the composite has a molar ratio of: approximately 20% to approximately 95% acrylate material; and approximately 80% to approximately 5% phosphonate material.*

*31. The display of claim 24, wherein the luminescent metal ions include: rare earth compounds.*

*32. The display of claim 24, wherein the luminescent metal ions include: $NaYF_4$:ErYb.*

*33. The display of claim 24, wherein the composite is: phosphorylated polymethyl methacrylate (p-PPMA).*

*34. The display of claim 24, wherein the luminescent metal ions include: rare earth ions co-doped with $Yb^{3+}$ in fluoride and orthophosphate crystalline hosts.*

*35. The display of claim 34, wherein the doping ion further includes: Tm.*

*36. The display of claim 34, wherein the doping ion further includes: Er.*

*37. The display of claim 34, wherein the doping ion further includes: Ho.*

*38. The display of claim 34, wherein the doping ion further includes: Nd.*

*39. The display of claim 34, wherein the doping ion further includes: Pr.*

*40. The display of claim 34, wherein the doping ion further includes: Ce.*

*41. The display of claim 34, wherein the crystalline hosts include: $NaYF_4$.*

*42. The display of claim 34, wherein the crystalline hosts include: KYF.*

*43. The display of claim 34, wherein the crystalline hosts include: YLF.*

*44. The display of claim 34, wherein the crystalline hosts include: $LuPO_4$.*

*45. An optical system comprising a polymer composition comprising a co-polymer composite of an alkyl material and a phosphonate material; and luminescent metal ions dispersed in the composite.*

*46. The system of claim 45, wherein the alkyl material includes: alkyl acrylate.*

*47. The system of claim 45, wherein the alkyl material includes: alkyl methacrylate.*

*48. The system of claim 45, wherein the phosphonate material includes: dialkyl vinylbenzylphosphonate.*

*49. The system of claim 45, wherein the phosphonate material includes: alkyl vinylbenzylphosphonic acid monoester.*

*50. The system of claim 45, wherein the phosphonate material includes: vinylbenzylphosphonic acid.*

*51. The system of claim 45, wherein the composite has a molar ratio of: approximately 20% to approximately 95% acrylate material; and approximately 80% to approximately 5% phosphonate material.*

*52. The system of claim 45, wherein the luminescent metal ions include: rare earth compounds.*

*53. The system of claim 45, wherein the luminescent metal ions include: $NaYF_4$:ErYb.*

*54. The system of claim 45, wherein the composite is: phosphorylated polymethyl methacrylate (p-PPMA).*

*55. The system of claim 45, wherein the luminescent metal ions include: rare earth ions co-doped with $Yb^{3+}$ in fluoride and orthophosphate crystalline hosts.*

*56. The system of claim 55, wherein the doping ion further includes: Tm.*

*57. The system of claim 55, wherein the doping ion further includes: Er.*

*58. The system of claim 55, wherein the doping ion further includes: Ho.*

*59. The system of claim 55, wherein the doping ion further includes: Nd.*

*60. The system of claim 55, wherein the doping ion further includes: Pr.*

*61. The system of claim 55, wherein the doping ion further includes: Ce.*

*62. The system of claim 55, wherein the crystalline hosts include: $NaYF_4$.*

*63. The system of claim 55, wherein the crystalline hosts include: KYF.*

*64. The system of claim 55, wherein the crystalline hosts include: YLF.*

*65. The system of claim 55, wherein the crystalline hosts include: $LuPO_4$.*

*66. An optical fiber amplifier comprising a polymer system comprising a co-polymer composite of an alkyl material and a phosphonate material; and luminescent metal ions dispersed in the composite.*

*67. The amplifier of claim 66, wherein the alkyl material includes: alkyl acrylate.*

*68. The amplifier of claim 66, wherein the alkyl material includes: alkyl methacrylate.*

*69. The amplifier of claim 66, wherein the phosphonate material includes: dialkyl vinylbenzylphosphonate.*

*70. The amplifier of claim 66, wherein the phosphonate material includes: alkyl vinylbenzylphosphonic acid monoester.*

*71. The amplifier of claim 66, wherein the phosphonate material includes: vinylbenzylphosphonic acid.*

*72. The amplifier of claim 66, wherein the composite has a molar ratio of: approximately 20% to approximately 95% acrylate material; and approximately 80% to approximately 5% phosphonate material.*

*73. The amplifier of claim 66, wherein the luminescent metal ions include: rare earth compounds.*

*74. The amplifier of claim 66, wherein the luminescent metal ions include: $NaYF_4$:ErYb.*

*75. The amplifier of claim 66, wherein the composite is: phosphorylated polymethyl methacrylate (p-PPMA).*

*76. The amplifier of claim 66, wherein the luminescent metal ions include: rare earth ions co-doped with $Yb^{3+}$ in fluoride and orthophosphate crystalline hosts.*

*77. The amplifier of claim 76, wherein the doping ion further includes: Tm.*

*78. The amplifier of claim 76, wherein the doping ion further includes: Er.*

*79. The amplifier of claim 76, wherein the doping ion further includes: Ho.*

*80. The amplifier of claim 76, wherein the doping ion further includes: Nd.*

*81. The amplifier of claim 76, wherein the doping ion further includes: Pr.*

*82. The amplifier of claim 76, wherein the doping ion further includes: Ce.*

*83. The amplifier of claim 76, wherein the crystalline hosts include: $NaYF_4$.*

*84. The amplifier of claim 76, wherein the crystalline hosts include: KYF.*

*85. The amplifier of claim 76, wherein the crystalline hosts include: YLF.*

*86. The amplifier of claim 76, wherein the crystalline hosts include: $LuPO_4$.*

* * * * *